United States Patent [19]

Lorensen et al.

[11] Patent Number: 4,751,643

[45] Date of Patent: Jun. 14, 1988

[54] METHOD AND APPARATUS FOR DETERMINING CONNECTED SUBSTRUCTURES WITHIN A BODY

[75] Inventors: William E. Lorensen, Ballston Lake; Harvey E. Cline, Schenectady, both of N.Y.

[73] Assignee: General Electric Company, Schenectady, N.Y.

[21] Appl. No.: 893,060

[22] Filed: Aug. 4, 1986

[51] Int. Cl.⁴ .............................................. G06F 15/42
[52] U.S. Cl. .................................... 364/414; 378/901; 382/6; 382/27
[58] Field of Search ........................ 378/901; 324/309; 364/414; 340/729; 382/6, 22, 27

[56] References Cited

U.S. PATENT DOCUMENTS

| | | | |
|---|---|---|---|
| 4,493,039 | 1/1985 | Gregory | 364/414 |
| 4,506,327 | 3/1985 | Tam | 378/901 X |
| 4,538,227 | 8/1985 | Toraichi | 364/414 |
| 4,551,680 | 11/1985 | Macovski | 324/309 |
| 4,590,558 | 5/1986 | Glover | 378/901 X |
| 4,641,351 | 2/1987 | Preston | 364/414 X |

OTHER PUBLICATIONS

Ehud Artzy et al., "The Theory, Design, Implementation and Evaluation of a Three-Dimensional Surface Detection Algorithm", *Computer Graphics and Image Processing*, vol. 15 (1981).
H. E. Cline et al., "Computer-Aided Surface Reconstruction of Interference Contours", *Applied Optics*, vol. 21, No. 24, Dec. 15, 1982, pp. 4481-4488.
James D. Foley et al., "Fundamentals of Interactive Computer Graphics", Addison-Wesley Publishing Company, pp. 446-450.

*Primary Examiner*—Jerry Smith
*Assistant Examiner*—Steven G. Kibby
*Attorney, Agent, or Firm*—Lawrence D. Cutter; James C. Davis, Jr.; Marvin Snyder

[57] ABSTRACT

An apparatus and method for determining connected substructures within a body is disclosed. The system and method are particularly advantageous for use in medical diagnostic imaging applications. In particular, three dimensional regions exhibiting the same tissue type are similarly labeled. Using the label information together with a seed location located in the substructure of interest, all similarly labeled connected data points are determined. The system and method of the present invention is operable in any situation in which three dimensional signal patterns representing the value of one or more physical properties associated with the substructures within a body at regularly grid locations within the body are presented. A subset of the original data is then provided to a display processor particularly one employing gradient normal shading for display of three dimensional images.

36 Claims, 28 Drawing Sheets

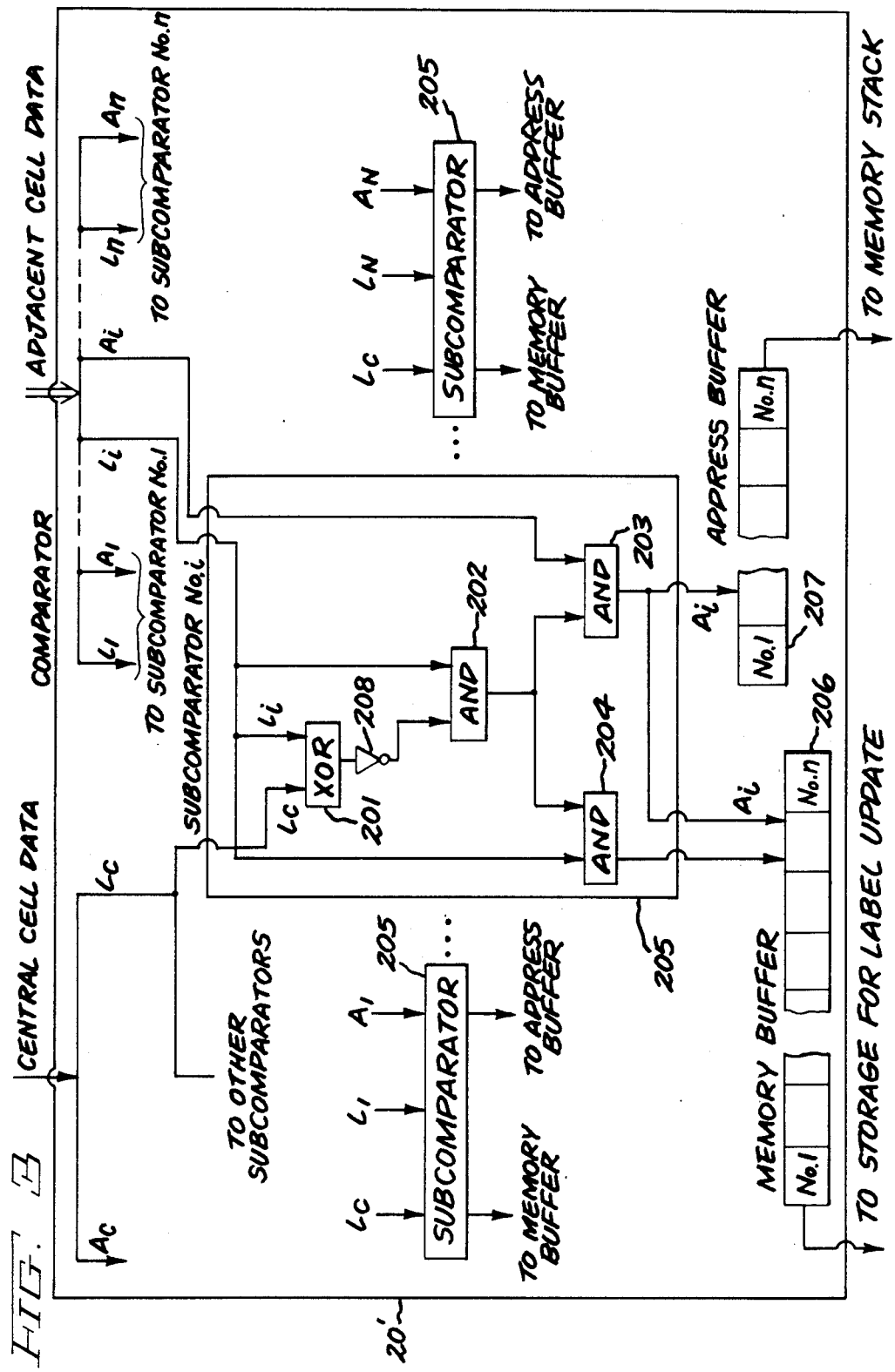

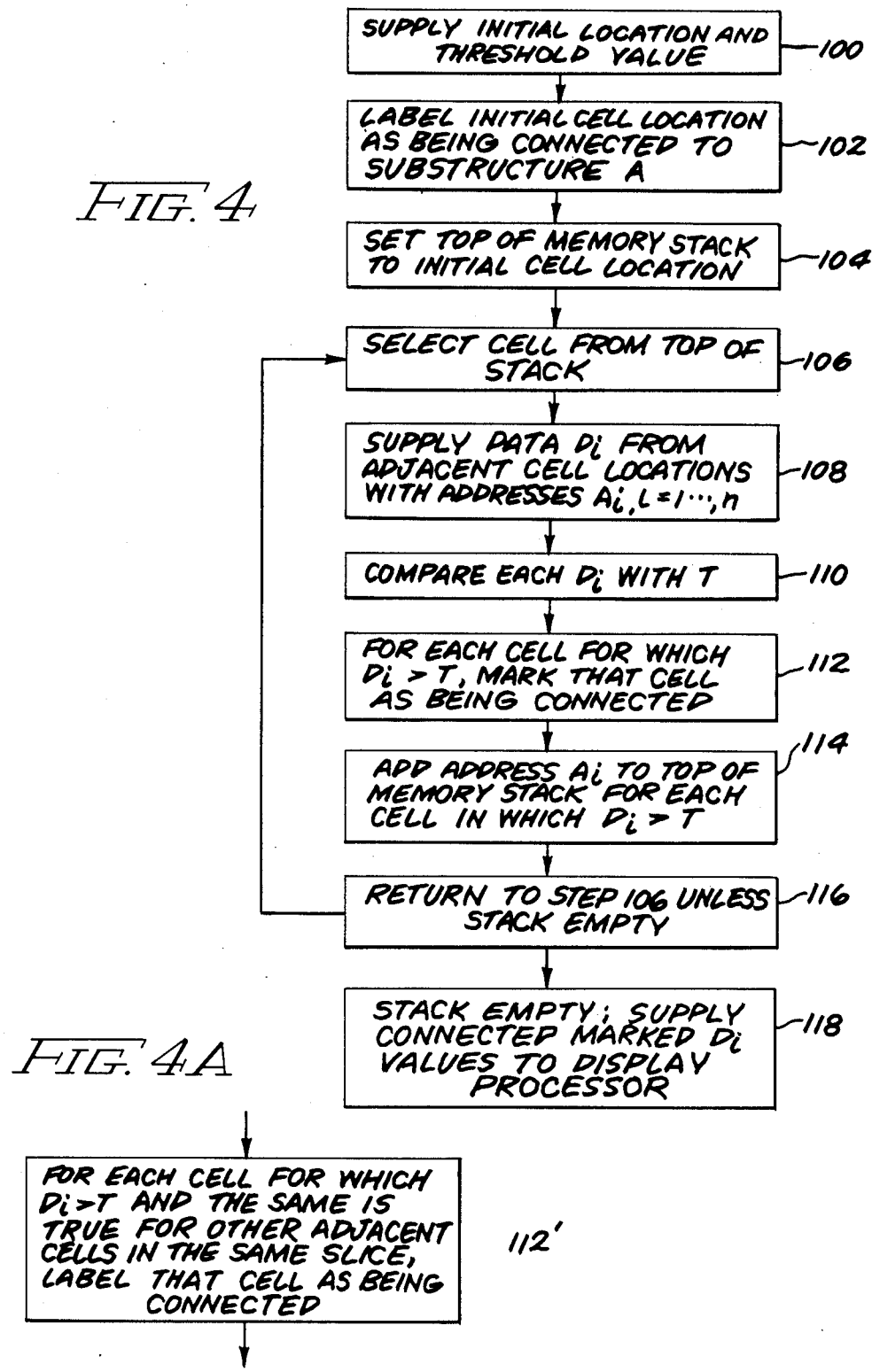

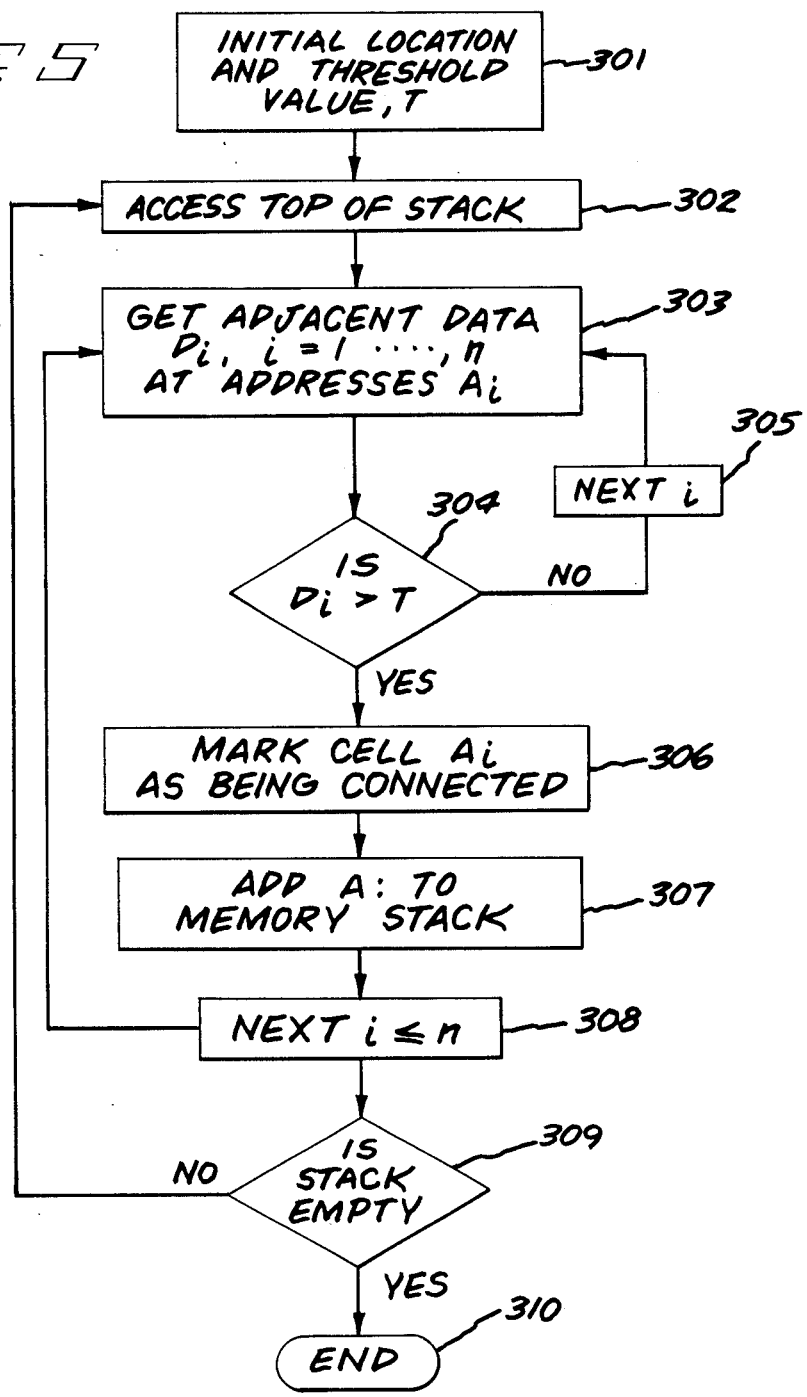

SLICE i + 1

SLICE i

SLICE i - 1

SLICE i + 1

SLICE i

SLICE i - 1

FIG. 9A

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 6 | 6 | 6 | 8 | 7 | 6 | 5 | 5 | 4 | 4 | 3 | 2 | 2 |
| 2 | 6 | 7 | 7 | 9 | 7 | 6 | 6 | 6 | 6 | 5 | 4 | 3 | 3 |
| 3 | 6 | 8 | 9 | 8 | 6 | 6 | 6 | 7 | 8 | 6 | 5 | 4 | 4 |
| 4 | 6 | 7 | 7 | 6 | 6 | 6 | 7 | 8 | 7 | 6 | 5 | 5 | 5 |
| 5 | 6 | 7 | 7 | 6 | 6 | 7 | 8 | 8 | 7 | 6 | 6 | 6 | 6 |
| 6 | 6 | 7 | 7 | 6 | 7 | 8 | 7 | 6 | 5 | 6 | 6 | 7 | 7 |
| 7 | 7 | 8 | 7 | 6 | 7 | 7 | 6 | 5 | 6 | 6 | 8 | 8 | 7 |
| 8 | 8 | 8 | 6 | 6 | 6 | 6 | 5 | 6 | 7 | 8 | 9 | 8 | 7 |
| 9 | 8 | 8 | 6 | 6 | 5 | 5 | 6 | 7 | 8 | 9 | 9 | 8 | 6 |
| 10 | 8 | 9 | 8 | 6 | 6 | 6 | 6 | 7 | 8 | 9 | 8 | 7 | 6 |
| 11 | 8 | 9 | 8 | 7 | 7 | 7 | 6 | 6 | 6 | 6 | 7 | 7 | 6 |
| 12 | 6 | 6 | 6 | 7 | 7 | 7 | 6 | 5 | 5 | 5 | 6 | 6 | 6 |
| 13 | 4 | 5 | 5 | 5 | 6 | 6 | 6 | 4 | 4 | 4 | 4 | 5 | 5 |

THRESHOLD = 6.5

FIG. 9B

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | 1 | 1 | 0 | 0 | 0 | 0 |
| 4 | 0 | 1 | 1 | 0 | 0 | 0 | 1 | 1 | 1 | 0 | 0 | 0 | 0 |
| 5 | 0 | 1 | 1 | 0 | 0 | 1 | 1 | 1 | 1 | 0 | 0 | 0 | 0 |
| 6 | 0 | 1 | 1 | 0 | 1 | 1 | 1 | 0 | 0 | 0 | 0 | 1 | 1 |
| 7 | 1 | 1 | 1 | 0 | 1 | 1 | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

FIG. 9C

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | 1 | 1 | 0 | 0 | 0 | 0 |
| 4 | 0 | 1 | 1 | 0 | 0 | 0 | 1 | 1 | 1 | 0 | 0 | 0 | 0 |
| 5 | 0 | 1 | 1 | 0 | 0 | 1 | 1 | 1 | 1 | 0 | 0 | 0 | 0 |
| 6 | 0 | 1 | 1 | 0 | 1 | 1 | 1 | 0 | 0 | 0 | 0 | 1 | 1 |
| 7 | 1 | 1 | 1 | 0 | 1 | 1 | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

FIG. 9D

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | 1 | 1 | 0 | 0 | 0 | 0 |
| 4 | 0 | 1 | 1 | 0 | 0 | 0 | 1 | 1 | 1 | 0 | 0 | 0 | 0 |
| 5 | 0 | 1 | 1 | 0 | 0 | 1 | 1 | 1 | 1 | 0 | 0 | 0 | 0 |
| 6 | 0 | 1 | 1 | 0 | 1 | 1 | 1 | 0 | 0 | 0 | 0 | 1 | 1 |
| 7 | 1 | 1 | 1 | 0 | 1 | 1 | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

SELECT INITIAL GRID LOCATIONS (5,7)
COMPARE ADJACENT GRID LOCATIONS (5,6),(6,7),(5,8),(4,7)

FIG. 9E

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | 1 | 1 | 0 | 0 | 0 | 0 |
| 4 | 0 | 1 | 1 | 0 | 0 | 0 | 1 | 1 | 1 | 0 | 0 | 0 | 0 |
| 5 | 0 | 1 | 1 | 0 | 0 | 1 | 1 | 1 | 1 | 0 | 0 | 0 | 0 |
| 6 | 0 | 1 | 1 | 0 | A | 1 | 1 | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

MARK LOCATIONS DETERMINED TO BE CONNECTED
ADD LOCATIONS (5,6) AND (6,7) TO STACK (IN THAT ORDER)

FIG. 9F

|   | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | 1 | 1 | 0 | 0 | 0 | 0 |
| 4 | 0 | 1 | 1 | 0 | 0 | 0 | 1 | 1 | 1 | 0 | 0 | 0 | 0 |
| 5 | 0 | 1 | 1 | 0 | 0 | 1 | 1 | 1 | 1 | 0 | 0 | 0 | 0 |
| 6 | 0 | 1 | 1 | 0 | A | A | 1 | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

(5,6) IS NEW TOP OF STACK LOCATION
COMPARE (5,6) WITH ADJACENT UNMARKED (NON-A) LOCATIONS
MARK LOCATIONS DETERMINED TO BE CONNECTED NAMELY (6,6)
ADD (6,6) TO TOP OF STACK
STACK NOW CONTAINS : (6,6), (6,7)

FIG 9G

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0  | 0  | 0  | 0  |
| 2 | 0 | 1 | 1 | 1 | 1 | 0 | 0 | 0 | 0 | 0  | 0  | 0  | 0  |
| 3 | 0 | 1 | 1 | 1 | 0 | 0 | 0 | 1 | 1 | 0  | 0  | 0  | 0  |
| 4 | 0 | 1 | 1 | 0 | 0 | 0 | 1 | 1 | 1 | 0  | 0  | 0  | 0  |
| 5 | 0 | 1 | 1 | 0 | 0 | A | 1 | 1 | 1 | 0  | 0  | 0  | 0  |
| 6 | 0 | 1 | 1 | 0 | A | A | A | 0 | 0 | 0  | 0  | 1  | 1  |
| 7 | 1 | 1 | 1 | 0 | A | A | 0 | 0 | 0 | 0  | 1  | 1  | 1  |
| 8 | 1 | 1 | 0 | 0 | 0 | 0 | 0 | 0 | 1 | 1  | 1  | 1  | 1  |
| 9 | 1 | 1 | 0 | 0 | 0 | 0 | 0 | 1 | 1 | 1  | 1  | 1  | 0  |
| 10| 1 | 1 | 1 | 0 | 0 | 0 | 0 | 1 | 1 | 1  | 1  | 1  | 0  |
| 11| 1 | 1 | 1 | 1 | 1 | 1 | 0 | 0 | 0 | 0  | 1  | 1  | 0  |
| 12| 0 | 0 | 0 | 1 | 1 | 1 | 0 | 0 | 0 | 0  | 0  | 0  | 0  |
| 13| 0 | 0 | 0 | 0 | 0 | 0 | 0 | 0 | 0 | 0  | 0  | 0  | 0  |

(6,6) IS NEW TOP OF STACK LOCATION
COMPARE (6,6) WITH ADJACENT UNMARKED LOCATIONS
MARK (6,5) AND (7,6) AS BEING CONNECTED
ADD (6,5) AND (7,6) TO STACK
STACK NOW CONTAINS: (6,5), (7,6), (6,7)

FIG. 9H

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | 1 | 1 | 0 | 0 | 0 | 0 |
| 4 | 0 | 1 | 1 | 0 | 0 | 0 | 1 | 1 | 1 | 0 | 0 | 0 | 0 |
| 5 | 0 | 1 | 1 | 0 | 0 | A | A | 1 | 1 | 0 | 0 | 0 | 0 |
| 6 | 0 | 1 | 1 | 0 | A | A | A | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

(6,5) IS NEW TOP OF STACK LOCATION
COMPARE (6,5) WITH ADJACENT UNMARKED LOCATIONS
MARK (7,5) AS BEING CONNECTED
ADD (7,5) TO TOP OF STACK
STACK NOW CONTAINS : (7,5),(7,6),(6,7)

FIG. 9I

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | 1 | 1 | 0 | 0 | 0 | 0 |
| 4 | 0 | 1 | 1 | 0 | 0 | 0 | A | 1 | 1 | 0 | 0 | 0 | 0 |
| 5 | 0 | 1 | 1 | 0 | 0 | A | A | A | 1 | 0 | 0 | 0 | 0 |
| 6 | 0 | 1 | 1 | 0 | A | A | A | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

(7,5) IS NEW TOP OF STACK LOCATION
COMPARE (7,5) WITH ADJACENT UNMARKED LOCATIONS
ADD (7,4) AND (8,5) TO TOP OF STACK
STACK NOW CONTAINS (3,4),(8,5),(7,6),(6,7)

FIG. 9J

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0  | 0  | 0  | 0  |
| 2 | 0 | 1 | 1 | 1 | 1 | 0 | 0 | 0 | 0 | 0  | 0  | 0  | 0  |
| 3 | 0 | 1 | 1 | 1 | 0 | 0 | 0 | 1 | 1 | 0  | 0  | 0  | 0  |
| 4 | 0 | 1 | 1 | 0 | 0 | 0 | A | A | 1 | 0  | 0  | 0  | 0  |
| 5 | 0 | 1 | 1 | 0 | 0 | A | A | A | 1 | 0  | 0  | 0  | 0  |
| 6 | 0 | 1 | 1 | 0 | A | A | A | 0 | 0 | 0  | 0  | 1  | 1  |
| 7 | 1 | 1 | 1 | 0 | A | A | 0 | 0 | 0 | 0  | 1  | 1  | 1  |
| 8 | 1 | 1 | 0 | 0 | 0 | 0 | 0 | 0 | 1 | 1  | 1  | 1  | 1  |
| 9 | 1 | 1 | 0 | 0 | 0 | 0 | 0 | 1 | 1 | 1  | 1  | 1  | 0  |
| 10 | 1 | 1 | 1 | 0 | 0 | 0 | 0 | 1 | 1 | 1  | 1  | 1  | 0  |
| 11 | 1 | 1 | 1 | 1 | 1 | 1 | 0 | 0 | 0 | 0  | 1  | 1  | 0  |
| 12 | 0 | 0 | 0 | 1 | 1 | 1 | 0 | 0 | 0 | 0  | 0  | 0  | 0  |
| 13 | 0 | 0 | 0 | 0 | 0 | 0 | 0 | 0 | 0 | 0  | 0  | 0  | 0  |

(7,4) IS NEW TOP OF STACK LOCATION
COMPARE (7,4) WITH ADJACENT UNMARKED LOCATIONS
ADD (8,4) TO TOP OF STACK
STACK NOW CONTAINS (8,4),(8,5),(7,6),(6,7)

FIG. 9K

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | A | 1 | 0 | 0 | 0 | 0 |
| 4 | 0 | 1 | 1 | 0 | 0 | 0 | A | A | A | 0 | 0 | 0 | 0 |
| 5 | 0 | 1 | 1 | 0 | 0 | A | A | A | 1 | 0 | 0 | 0 | 0 |
| 6 | 0 | 1 | 1 | 0 | A | A | A | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

(8,4) IS NEW TOP OF STACK LOCATION
COMPARE (8,4) WITH ADJACENT IN UNMARKED LOCATIONS
ADD (8,3) AND (9,4) TO TOP OF STACK
STACK NOW CONTAINS: (8,3),(9,4),(8,5),(7,6),(6,7)

FIG. 9L

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | A | A | 0 | 0 | 0 | 0 |
| 4 | 0 | 1 | 1 | 0 | 0 | 0 | A | A | A | 0 | 0 | 0 | 0 |
| 5 | 0 | 1 | 1 | 0 | 0 | A | A | A | 1 | 0 | 0 | 0 | 0 |
| 6 | 0 | 1 | 1 | 0 | A | A | A | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

(8,3) IS NEW TOP OF STACK LOCATION
COMPARE (8,3) WITH ADJACENT UNMARKED LOCATIONS
ADD (9,3) TO TOP OF STACK
STACK NOW CONTAINS: (9,3),(9,4),(8,5),(7,6),(6,7)

FIG. 9M

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0  | 0  | 0  | 0  |
| 2 | 0 | 1 | 1 | 1 | 1 | 0 | 0 | 0 | 0 | 0  | 0  | 0  | 0  |
| 3 | 0 | 1 | 1 | 1 | 0 | 0 | 0 | A | A | 0  | 0  | 0  | 0  |
| 4 | 0 | 1 | 1 | 0 | 0 | 0 | A | A | A | 0  | 0  | 0  | 0  |
| 5 | 0 | 1 | 1 | 0 | 0 | A | A | A | 1 | 0  | 0  | 0  | 0  |
| 6 | 0 | 1 | 1 | 0 | A | A | A | 0 | 0 | 0  | 0  | 1  | 1  |
| 7 | 1 | 1 | 1 | 0 | A | A | 0 | 0 | 0 | 0  | 1  | 1  | 1  |
| 8 | 1 | 1 | 0 | 0 | 0 | 0 | 0 | 0 | 1 | 1  | 1  | 1  | 1  |
| 9 | 1 | 1 | 0 | 0 | 0 | 0 | 0 | 1 | 1 | 1  | 1  | 1  | 0  |
| 10 | 1 | 1 | 1 | 0 | 0 | 0 | 0 | 1 | 1 | 1  | 1  | 1  | 0  |
| 11 | 1 | 1 | 1 | 1 | 1 | 1 | 0 | 0 | 0 | 0  | 1  | 1  | 0  |
| 12 | 0 | 0 | 0 | 1 | 1 | 1 | 0 | 0 | 0 | 0  | 0  | 0  | 0  |
| 13 | 0 | 0 | 0 | 0 | 0 | 0 | 0 | 0 | 0 | 0  | 0  | 0  | 0  |

(9,3) IS NEW TOP OF STACK LOCATION
COMPARE (9,3) WITH ADJACENT UNMARKED LOCATIONS
ADD NOTHING TO TOP OF STACK
STACK NOW CONTAINS: (9,4), (8,5), (7,6), (6,7)

FIG. 9N

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0  | 0  | 0  | 0  |
| 2 | 0 | 1 | 1 | 1 | 1 | 0 | 0 | 0 | 0 | 0  | 0  | 0  | 0  |
| 3 | 0 | 1 | 1 | 1 | 0 | 0 | 0 | A | A | 0  | 0  | 0  | 0  |
| 4 | 0 | 1 | 1 | 0 | 0 | 0 | A | A | A | 0  | 0  | 0  | 0  |
| 5 | 0 | 1 | 1 | 0 | 0 | A | A | A | A | 0  | 0  | 0  | 0  |
| 6 | 0 | 1 | 1 | 0 | A | A | A | 0 | 0 | 0  | 0  | 1  | 1  |
| 7 | 1 | 1 | 1 | 0 | A | A | 0 | 0 | 0 | 0  | 1  | 1  | 1  |
| 8 | 1 | 1 | 0 | 0 | 0 | 0 | 0 | 0 | 1 | 1  | 1  | 1  | 1  |
| 9 | 1 | 1 | 0 | 0 | 0 | 0 | 0 | 1 | 1 | 1  | 1  | 1  | 0  |
| 10| 1 | 1 | 1 | 0 | 0 | 0 | 0 | 1 | 1 | 1  | 1  | 1  | 0  |
| 11| 1 | 1 | 1 | 1 | 1 | 1 | 0 | 0 | 0 | 0  | 1  | 1  | 0  |
| 12| 0 | 0 | 0 | 1 | 1 | 1 | 0 | 0 | 0 | 0  | 0  | 0  | 0  |
| 13| 0 | 0 | 0 | 0 | 0 | 0 | 0 | 0 | 0 | 0  | 0  | 0  | 0  |

(9,4) IS NEW TOP OF STACK LOCATION
COMPARE (9,3) WITH ADJACENT UNMARKED LOCATIONS
ADD (9,5) TO TOP OF STACK
STACK NOW CONTAINS: (9,5), (8,5), (7,6), (6,7)

FIG. 90

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0  | 0  | 0  | 0  |
| 2 | 0 | 1 | 1 | 1 | 1 | 0 | 0 | 0 | 0 | 0  | 0  | 0  | 0  |
| 3 | 0 | 1 | 1 | 1 | 0 | 0 | 0 | A | A | 0  | 0  | 0  | 0  |
| 4 | 0 | 1 | 1 | 0 | 0 | 0 | A | A | A | 0  | 0  | 0  | 0  |
| 5 | 0 | 1 | 1 | 0 | 0 | A | A | A | A | 0  | 0  | 0  | 0  |
| 6 | 0 | 1 | 1 | 0 | A | A | A | 0 | 0 | 0  | 0  | 1  | 1  |
| 7 | 1 | 1 | 1 | 0 | A | A | 0 | 0 | 0 | 0  | 1  | 1  | 1  |
| 8 | 1 | 1 | 0 | 0 | 0 | 0 | 0 | 0 | 1 | 1  | 1  | 1  | 1  |
| 9 | 1 | 1 | 0 | 0 | 0 | 0 | 0 | 1 | 1 | 1  | 1  | 1  | 0  |
| 10| 1 | 1 | 1 | 0 | 0 | 0 | 0 | 1 | 1 | 1  | 1  | 1  | 0  |
| 11| 1 | 1 | 1 | 1 | 1 | 1 | 0 | 0 | 0 | 0  | 1  | 1  | 0  |
| 12| 0 | 0 | 0 | 1 | 1 | 1 | 0 | 0 | 0 | 0  | 0  | 0  | 0  |
| 13| 0 | 0 | 0 | 0 | 0 | 0 | 0 | 0 | 0 | 0  | 0  | 0  | 0  |

(9,5) IS NEW TOP OF STACK LOCATION
COMPARE (9,5) WITH ADJACENT UNMARKED LOCATIONS
ADD NOTHING TO TOP OF STACK
STACK NOW CONTAINS: (8,5), (7,6), (6,7)

FIG. 9P

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | A | A | 0 | 0 | 0 | 0 |
| 4 | 0 | 1 | 1 | 0 | 0 | 0 | A | A | A | 0 | 0 | 0 | 0 |
| 5 | 0 | 1 | 1 | 0 | 0 | A | A | A | A | 0 | 0 | 0 | 0 |
| 6 | 0 | 1 | 1 | 0 | A | A | A | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

(8,5) IS NEW TOP OF STACK LOCATION
COMPARE (8,5) WITH ADJACENT UNMARKED LOCATIONS
ADD NOTHING TO TOP OF STACK
STACK NOW CONTAINS: (7,6), (6,7)

FIG. 9Q

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | A | A | 0 | 0 | 0 | 0 |
| 4 | 0 | 1 | 1 | 0 | 0 | 0 | A | A | A | 0 | 0 | 0 | 0 |
| 5 | 0 | 1 | 1 | 0 | 0 | A | A | A | A | 0 | 0 | 0 | 0 |
| 6 | 0 | 1 | 1 | 0 | A | A | A | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

(7,6) IS NEW TOP OF STACK LOCATION
COMPARE (7,6) WITH ADJACENT UNMARKED LOCATIONS
ADD NOTHING TO TOP OF STACK
STACK NOW CONTAINS (6,7)

FIG. 9R

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | A | A | 0 | 0 | 0 | 0 |
| 4 | 0 | 1 | 1 | 0 | 0 | 0 | A | A | A | 0 | 0 | 0 | 0 |
| 5 | 0 | 1 | 1 | 0 | 0 | A | A | A | A | 0 | 0 | 0 | 0 |
| 6 | 0 | 1 | 1 | 0 | A | A | A | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

(6,7) IS NEW TOP OF STACK LOCATION
COMPARE (6,7) WITH ADJACENT UNMARKED LOCATIONS
ADD NOTHING TO STACK
STACK IS EMPTY

FIG. 9S

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 1 | 1 | 0 | 0 | 0 | 0 | 0 | 0 | 0 | 0 |
| 2 | 0 | 1 | 1 | 1 | 1 | 0 | 0 | 0 | 0 | 0 | 0 | 0 | 0 |
| 3 | 0 | 1 | 1 | 1 | 0 | 0 | 0 | A | A | 0 | 0 | 0 | 0 |
| 4 | 0 | 1 | 1 | 0 | 0 | 0 | A | A | A | 0 | 0 | 0 | 0 |
| 5 | 0 | 1 | 1 | 0 | 0 | A | A | A | A | 0 | 0 | 0 | 0 |
| 6 | 0 | 1 | 1 | 0 | A | A | A | 0 | 0 | 0 | 0 | 1 | 1 |
| 7 | 1 | 1 | 1 | 0 | A | A | 0 | 0 | 0 | 0 | 1 | 1 | 1 |
| 8 | 1 | 1 | 0 | 0 | 0 | 0 | 0 | 0 | 1 | 1 | 1 | 1 | 1 |
| 9 | 1 | 1 | 0 | 0 | 0 | 0 | 0 | 1 | 1 | 1 | 1 | 1 | 0 |
| 10 | 1 | 1 | 1 | 0 | 0 | 0 | 0 | 1 | 1 | 1 | 1 | 1 | 0 |
| 11 | 1 | 1 | 1 | 1 | 1 | 1 | 0 | 0 | 0 | 0 | 1 | 1 | 0 |
| 12 | 0 | 0 | 0 | 1 | 1 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 |

CELLS WHICH WERE INSPECTED

FIG. 9T

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | | | | | | | | | | | | | |
| 2 | | | | | | | | | | | | | |
| 3 | | | | | | | | 7 | 8 | | | | |
| 4 | | | | | | | 7 | 8 | 7 | | | | |
| 5 | | | | | | 7 | 8 | 8 | 7 | | | | |
| 6 | | | | | 7 | 8 | 7 | | | | | | |
| 7 | | | | | 7 | 7 | | | | | | | |
| 8 | | | | | | | | | | | | | |
| 9 | | | | | | | | | | | | | |
| 10 | | | | | | | | | | | | | |
| 11 | | | | | | | | | | | | | |
| 12 | | | | | | | | | | | | | |
| 13 | | | | | | | | | | | | | |

FIG. 9U

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 6 | 6 | 6 | 8 | 7 | 6 | 5 | 5 | 4 | 4 | 3 | 2 | 2 |
| 2 | 6 | 7 | 7 | 9 | 7 | 6 | 6 | 6 | 6 | 5 | 4 | 3 | 3 |
| 3 | 6 | 8 | 9 | 8 | 6 | 6 | 6 | -7 | -8 | 6 | 5 | 4 | 4 |
| 4 | 6 | 7 | 7 | 6 | 6 | 6 | -7 | -8 | -7 | 6 | 5 | 5 | 5 |
| 5 | 6 | 7 | 7 | 6 | 6 | -7 | -8 | -8 | -7 | 6 | 6 | 6 | 6 |
| 6 | 6 | 7 | 7 | 6 | -7 | -8 | -7 | 6 | 5 | 6 | 6 | 7 | 7 |
| 7 | 7 | 8 | 7 | 6 | -7 | -7 | 6 | 5 | 6 | 6 | 8 | 8 | 7 |
| 8 | 8 | 8 | 6 | 6 | 6 | 6 | 5 | 6 | 7 | 8 | 9 | 8 | 7 |
| 9 | 8 | 8 | 6 | 6 | 5 | 5 | 6 | 7 | 8 | 9 | 9 | 8 | 6 |
| 10 | 8 | 9 | 8 | 6 | 6 | 6 | 6 | 7 | 8 | 9 | 8 | 7 | 6 |
| 11 | 8 | 9 | 8 | 7 | 7 | 7 | 6 | 6 | 6 | 6 | 7 | 7 | 6 |
| 12 | 6 | 6 | 6 | 7 | 7 | 7 | 6 | 5 | 5 | 5 | 5 | 6 | 6 |
| 13 | 4 | 5 | 5 | 5 | 6 | 6 | 6 | 4 | 4 | 4 | 4 | 5 | 5 |

METHOD AND APPARATUS FOR DETERMINING CONNECTED SUBSTRUCTURES WITHIN A BODY

BACKGROUND OF THE INVENTION

The present invention is generally directed to a method and apparatus for three dimensional display of connected substructures within a body. More particularly, the present invention is directed to a system and method for the display of medical and other images produced from magnetic resonance imaging devices and from computerized axial tomographic machines. Even more particularly, the present invention is directed to a display system in which connected anatomical features are isolated for three dimensional display.

Computerized axial tomography and related x-ray imaging systems are capable of producing signal patterns representing the value of at least one physical property associated with substructures within a three dimensional body. In the case of medical imaging, the body typically comprises a patient or patient limb. In the case of industrial systems, the body may comprise a turbine blade or other part exhibiting an internal structure. Additionally, magnetic resonance imaging systems are also particularly capable of generating such data for various biological life forms. In the case of x-ray tomography, the physical property being measured is typically an x-ray absorption coefficient associated with various locations throughout a body. In the case of magnetic resonance imaging, nuclear precession decay signals are typically measured. However, the present invention is not confined to utilization with either computerized axial tomography systems or with magnetic resonance imaging systems. For example, positron emission tomography and single photon emission radiography systems may also be employed in conjunction with the system and method of the present invention. For the purposes of the present invention, the most relevant feature of such systems is their ability to generate signal patterns representing the value of one or more physical properties associated with various substructures within the body at regularly spaced cell or grid locations.

In three U.S. Patents assigned to the same assignee as the present invention, systems and methods for the display of three dimensional data are disclosed. These are: U.S. Pat. No. 4,729,098 filed June 6, 1985 titled "System and Method Employing Nonlinear Interpolation for the Display of Surface Structures Contained Within the Interior Region of a Solid Body" and U.S. Pat. No. 4,710,876 filed June 6, 1985 titled "System and Method for the Display of Surface Structures Within the Interior Region of a Solid Body" and U.S. Pat. No. 4,719,585 filed Aug. 28, 1985 titled "Dividing Cube System and Method for the Display of Surface Structures Contained Within the Interior Region of a Solid Body". All three of these patents are hereby incorporated herein by reference. These patents generally describe the marching cubes and dividing cubes systems for the display of shaded images on a display device such as a cathode ray tube (CRT). The present system and method can be thought of as a preprocessor for the production of data to be supplied to dividing cubes or marching cubes systems. These systems typically employ information supplied from magnetic resonance imaging or CAT scanner x-ray systems (although they are not limited thereto). They produce a shaded image on a screen in such a manner as to create, with shading, the illusion of a true three dimensional view on a two dimensional screen. By the operator choosing certain data value ranges, it is possible for such systems to display only bone tissue, or only other soft tissue structures. These systems also readily permit the sectioning of the data so as to produce a shaded three dimensional image which accurately depicts those structures which would be visible if the body were sliced in a specified direction. Such systems provide radiologists and surgeons with extensive preoperative information to enable them to more precisely and accurately carry out the intended surgical procedure. It should be particularly noted with respect to systems of the present invention that, in general, all views are provided from a single set of data collected at one time from the patient. The data is typically collected as a sequence of tomographic slice data. However, it is also possible to collect data over various periods of time, when necessary for the purpose of monitoring temporal changes within the patient's body.

While the three dimensional display systems described in the above-identified patents operate to quickly and effectively display highly desirable medical information, there is nonetheless other information which is contained within the data which is not readily viewable by the above-described systems. In particular, while the systems described in the patent applications described above are capable of selectively displaying only those tissues which exhibit data values in a specified range, there may be several different organs or tissues which also exhibit physical property data values in the same range. All such structures are either entirely displayed or entirely eliminated from view in the systems described in these patent applications. For example, it would be desirable to be able to isolate a particular bone from data which relates to several different, non-connected bone structures. Likewise, it would also be desirable to display images of a vascular network isolated from surrounding tissue. Similarly, it would be desirable to display images of the brain isolated from other similar head tissues such as skin. While it is relatively easy to isolate brain tissue from surrounding bone tissue because of their different physical properties, the similarity of brain and facial tissue properties makes isolation for viewing more difficult. However, advantage is taken in the system and method of the present invention of the fact that brain and facial skin tissue, for example, are not physically connected tissue structures. Accordingly, the present invention employs geometric connectivity of adjacent structures to isolate, for display purposes, select substructures within a solid body being imaged. The system and method described herein are seen to be particularly well adapted for use in conjunction with either the marching cubes or dividing cubes systems described above.

SUMMARY OF THE INVENTION

In accordance with a preferred embodiment of the present invention, a method for determining connected substructures within a body comprises the following steps. Three dimensional signal patterns representing the value of one or more physical properties associated with substructures within a body at regularly spaced parallelopiped grid locations within the body are stored in a memory means. Those signal patterns which represent values lying within a specified range, are selected and labeled as such. An initial grid location which corresponds to a position within or on a desired internal substructure is placed on a memory stack. The operative or topmost position in this stack is then "popped" (that is, selected and removed), and employed to access label information associated with a central cell or grid location as specified by information contained within the top of the memory stack. In the same way, label information associated with adjacent cells is also accessed and the labels of adjacent cells are compared with the label associated with the central grid location (cell) to identify those grid locations which exhibit the same label as the central cell. Those grid locations are marked as being connected when a selected arrangement of adjacent grid locations exhibit the same label. At the same time, the list of marked grid locations is stored on the memory stack. The information from the top of the memory stack is repeatedly accessed and the above process repeated, preferably until the stack is empty. In this way, those grid locations which are connected to the initial or seed cell location and which exhibit the same tissue type (label) are marked as being connected. In one sense, this method produces a "mask" which is used to isolate the substructure associated with the initial seed location. Means for carrying out this method is also described.

In the summary description provided above, the term "labeling" means providing an indication that certain data values lie within the same range. In contradistinction, the term "marked" means providing an indication that certain specified adjacent cells are connected. Initial connectedness is determined with respect to a seed or initial cell or grid location. Subsequent connectedness and the corresponding marking is determined with respect to subsequent cell locations as determined from the top of the memory stack. These terms are employed herein, as above, and throughout this specification and the appended claims. In short then, the terms "labeled" and "marked" are employed in the specific sense described above and care should be taken so as not to confuse the two concepts. Thus, it should be clear that different grid locations could be associated with the same label, as for example, two spots associated with bone tissue and yet not be marked as being connected, where these two spots exist on separate bones. These terms will be used throughout in the sense provided above.

In accordance with the embodiment of the invention described above, it is seen that labeling of the cell locations is completely performed prior to comparison of label values of the adjacent cells. However, in accordance with another embodiment of the present invention, actual cell data values are accessed. These values are accessed not only for the central grid locations specified by the top of the memory stack, but also for the adjacent grid locations. In this embodiment, direct comparison of the data values may be employed. If the adjacent data values do not lie in the same range as the value associated with the central grid location, such locations are essentially discarded as not being considered as part of the selected substructure. If adjacent values are found to be in the same range as the values associated with the central cell location, it is marked as potentially being connected and its address added to the stack if certain arrangement criteria are met. In this way, data values and their associated adjacent values need to be accessed only once. In accordance with a preferred embodiment of the present invention, the result of the comparison operation may be immediately written back into the data storage memory and may be readily encoded simply by assigning a negative value to connected cell locations exhibiting the same tissue type. In effect, the data associated with such cells is multiplied by a "−1". This represents a particularly facile way of marking desired grid locations.

In addition, it is also noted that the adjacency criteria generally marks, as connected, those grid locations for which a selected arrangement of adjacent grid locations exhibit the same label or same data range. In one embodiment of the present invention, a simple 1-connectedness is all that is required. However, in accordance with another embodiment of the present invention, 9-connectedness is employed to prevent spurious data or system noise from indicating as connected substructures which exhibit not connection, or at best, only a tenuous connection.

Accordingly, it is an object of the present invention to display connected substructures within a solid body.

It is also an object of the present invention to provide a system and method for determining connected substructures within a solid body.

It is yet another object of the present invention to extend the capabilities of magnetic resonance imaging systems, computerized tomography systems, positron emission tomography systems, other radiographic emission systems and the like.

It is still further object of the present invention to provide a graphics preprocessor for the marching cubes and dividing cubes systems.

It is yet another object of the present invention to improve the ability to produce useful, three dimensional representative images for use in medical diagnostic procedures.

It is a still further object of the present invention to provide a means for determining connectivity within solid objects.

Lastly, but not limited hereto, it is an object of the present invention to display selectively isolated substructures, particularly substructures associated with anatomical organs and tissues.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 3 is a schematic diagram illustrating in detail a comparator usable in the apparatus of FIG. 2;

FIG. 4 is a process flow diagram in accordance with one embodiment of the present invention;

FIG. 4A is a partial process flow diagram illustrating an alternate embodiment for one of the process steps illustrated in FIG. 4;

FIG. 5 is a flow chart particularly illustrating the operation of a comparator usable in the apparatus of FIG. 1;

FIG. 9A is a two dimensional sample illustration of data cell values;

FIG. 9B is a two dimensional list of cells which are labeled in conformance with a specified threshold criterion;

FIG. 9C is a view similar to FIG. 9B, but more particularly illustrating three non-connected regions having the same "tissue type";

FIG. 9D is a view similar to FIG. 9B illustrating selection of an initial or seed grid location and comparison with adjacent grid locations;

FIGS. 9E–9R illustrate sequential steps in the method of the present invention;

FIG. 9S illustrates those set of cells which were inspected as a consequence of the method of the present invention;

FIG. 9T illustrates one possible data set that results from application of the present invention;

FIG. 9U illustrates one method of marking connected cell locations in accordance with the present invention.

It is noted that FIGS. 9A–9U illustrate a two dimensional data situation as a means for better understanding the three dimensional application of the method and system described herein.

DETAILED DESCRIPTION OF THE INVENTION

Figure 1:
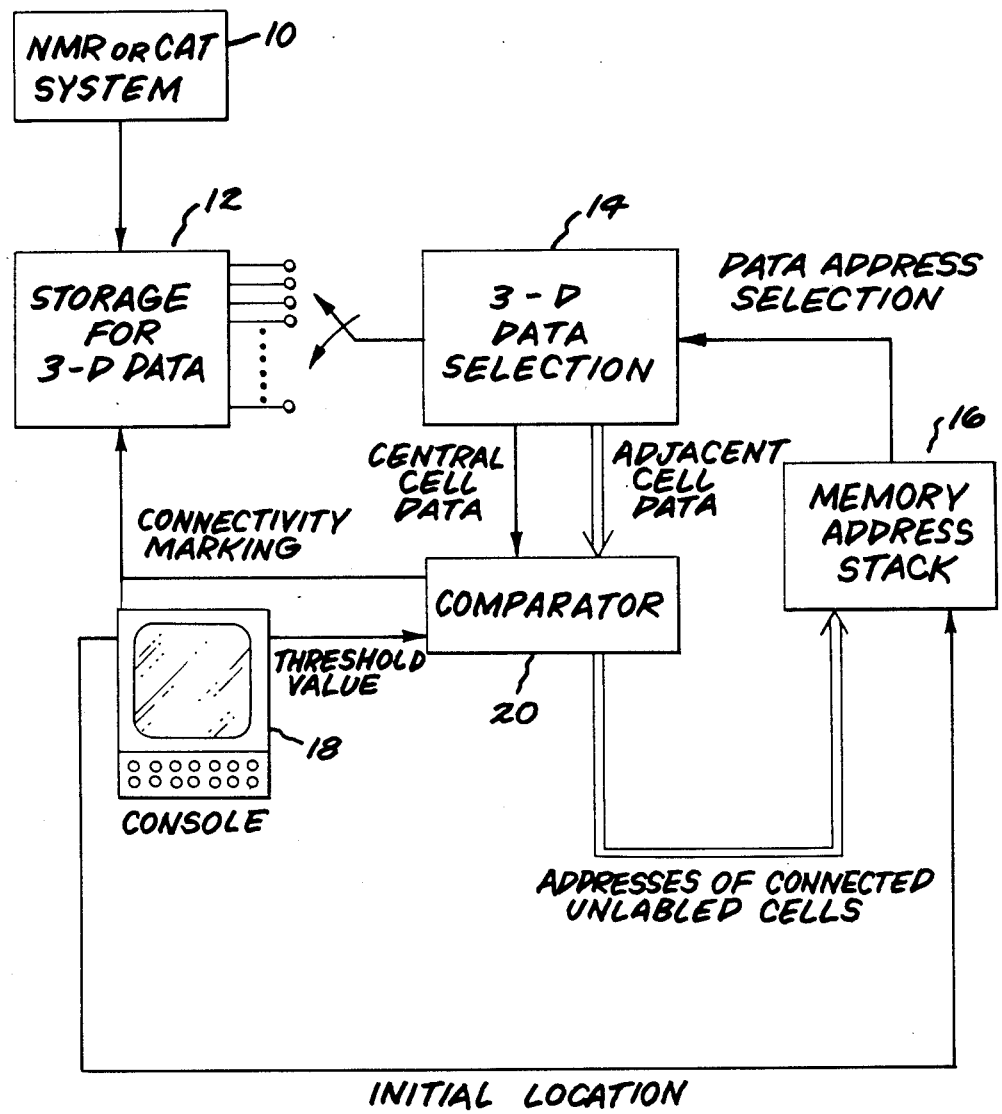
FIG. 1 is a schematic diagram illustrating a system in accordance with the present invention.
Figure 2:
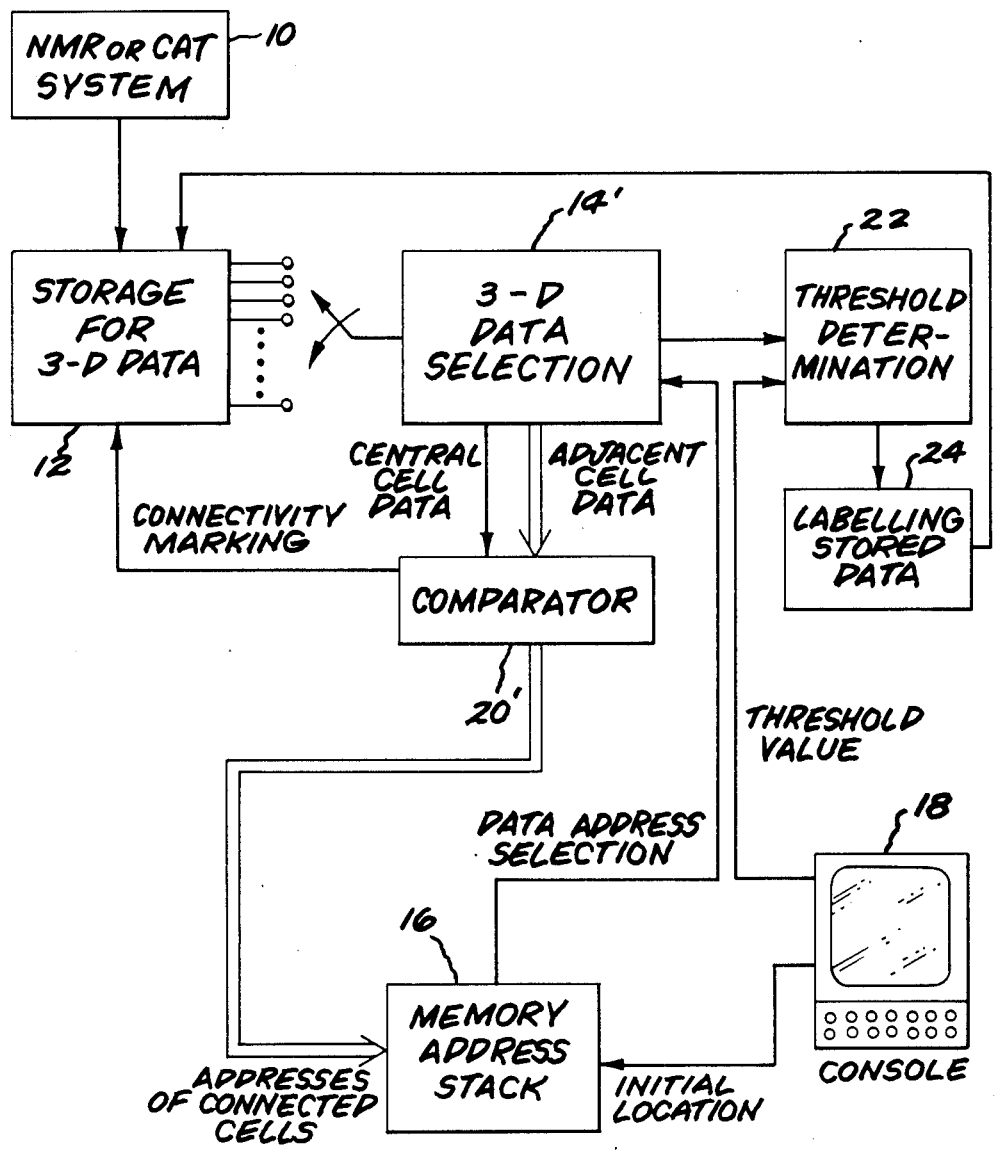
FIG. 2 is a schematic diagram of a system in accordance with the present invention which is similar to the system shown in FIG. 1 except that labeling is performed prior to adjacency comparisons.

FIG. 1 illustrates an apparatus in accordance with one embodiment of the present invention. FIG. 2 illustrates another such apparatus. However, it is noted that in both cases, all parts of the apparatus except for data generation means 10 may comprise a specially programmed digital computer or may comprise a digital computer with special board accessories. In both FIGS. 1 and 2, data generation means 10 is indicated as comprising a nuclear magnetic resonance imaging or computerized axial tomography system. As noted above, other systems may be employed for this purpose.

In any event, data generation means 10 provides three dimensional signal patterns representing the value of at least one physical property associated with substructures within a body being investigated. These values are associated with regularly spaced parallelopiped grid locations spaced throughout the body. In the systems of FIGS. 1 and 2, this data is preferably stored in storage means 12. Typically, data is generated, stored on a magnetic medium such as tape, and transferred at a later time to a storage medium such as a hard disk. For operation though, it is generally desirable that the three dimensional data information be made available in a random access memory. However, the amount of data present, together with its resolution, will determine how much of the total data can be stored in random access memory at any given time. It is also contemplated that storage means 12 could include virtual memory access mechanisms for retrieval of such data.

An important element of the present invention is memory address stack 16. This is typically a memory device which includes a pointer to the "top" position in the stack. Typically, such stacks are organized in a last in, first out (LIFO) queue-type discipline. However, other queue disciplines may also be employed without departing from the concepts of the present invention. It is also noted that memory address stack 16 may in fact comprise part of the same physical random access memory that may be associated with storage means 12. It is the repeated access of cell locations indicated by the top of memory address stack 16 which effectively drives the system of the present invention. The stack is initialized by the operator from console 18 by selecting an initial seed (grid) location. For example, if an image of the heart and its associated vascular network is desired, the operator selects a cell location, or voxel element, located within the heart as the location from which to determine connectivity information. Connectivity testing need only be carried out for cells possessing the same label or having data values lying within the same selected range. Thus, the operator of the present system selects two essential parameters through console 18. The first essential parameters is a threshold or range parameter which selects the tissue or structure type to be displayed. The second essential parameter is the seed location, as described above. This location determines the bone, tissue, organ or other substructure which is to be displayed. It is noted that the figures herein indicate that a threshold value is supplied from console 18. It is noted, however, that as used herein and in the appended claims, the term threshold refers not only to a single numerical limit value, but is also applicable to the specification of a range of values. The operator specifies, through threshold selection, the tissue type to be displayed; at the same time, through selection of an initial voxel element, the operator determines what particular organ or geometrically isolated tissue of this type is to be displayed. Thus, a particular bone from amongst a set of bones may be displayed. Display of this data may then be effectively accomplished by selecting a subset of the original data from generation means 10 for processing in accordance with the marching cubes or dividing cubes algorithms described above. It is noted that the references herein to classification by tissue type generally refer to the medical applications of the present invention. However, it should be noted that the present invention is not limited to the display of medical or anatomical information.

The apparatus of FIG. 1 also preferably includes three dimensional data selection means 14. This apparatus receives a data address (cell location) from the top of memory address stack 16. Memory address stack 16 is initialized with a cell location specified from console 18 by the operator. The address data from the "top" of the memory stack is used to select central cell data from storage means 12. At the same time, adjacent cell data addresses are generated by selection means 14 and these addresses are likewise supplied to memory means 12. Accordingly, data selection means 14 acts to supply central cell data and adjacent cell data to comparator 20. Thus, data selection means 14 receives data address (cell location) information from the top of memory stack 16 and in response thereto, supplies from storage means 12, central cell and adjacent cell data to comparator 20. In one embodiment of the present invention, each "central" cell is surrounded by six adjacent cell locations. For example, if the central cell specified was $(x, y, z)$, the following six cells would be accessed: $(x+1, y, z)$, $(x-1, y, z)$, $(x, y+1, z)$, $(x, y-1, z)$, $(x, y,$ $z+1$) and ($x, y, z-1$). However, the system and method of the present invention is not limited to selection of only six adjacent cells. More particularly, adjacent cell data may include information from all 26 surrounding cell locations. Also, adjacent cells may include all 26 surrounding cells except the eight cells at the corner of a voxel. In this case, there are thus 18 surrounding cells. Selection criteria for connectivity based upon these more general situation is discussed below.

One of the essential features of the system illustrated in FIG. 1 is comparator 20. For the system shown in FIG. 1, it is important to bear in mind that this system is designed to operate on the actual data from storage means 12. That is to say, no pre-labeling of tissue type is employed.

The operation of comparator 20 in FIG. 1 is somewhat different from the operation of comparator 20' shown in FIG. 2. In FIG. 2, pre-labeling of data cells occurs and comparator 20' does not receive exactly the same data as comparator 20. FIG. 4 does, however, illustrate a flow diagram for a process which is carried out by the system shown in FIG. 1. In particular, process flow steps designated by reference numerals 110, 112 and 114 correspond to operations carried out by comparator 20 in FIG. 1. In particular, comparator 20 operates as follows. Data values $D_i$ from adjacent cell locations with addresses $A_i$, with i ranging from 1 to n, are supplied to comparator 20. Each of these data values $D_i$ is compared with a threshold value T (or range as discussed above). For each cell for which $D_i$ is in the same desired range, that cell is marked as being connected to the central cell, as designated by the top of memory stack 16. Comparator 20 also functions to add each address $A_i$ to the top of the memory stack for each cell for which $D_i$ is in the desired range. The system then is seen to determine what cells are connected to what other cells and in turn what cells are connected to those cells. In this manner, a list of marked cells exhibiting the same tissue type is constructed. The marking of a connected cell structure may be accomplished in several ways. In one embodiment of the present invention, comparator 20 operates to change a sign bit associated with data in storage means 12. In this embodiment, it is assumed that all of the data supplied from generation means 10 is either entirely positive or entirely negative to start with or that a bias quantity has been added to that data to effect such a situation. In this way, a simple sign bit change, effected by comparator 20, operates to mark those data values and grid locations associated with internal substructures.

Figure 6A:
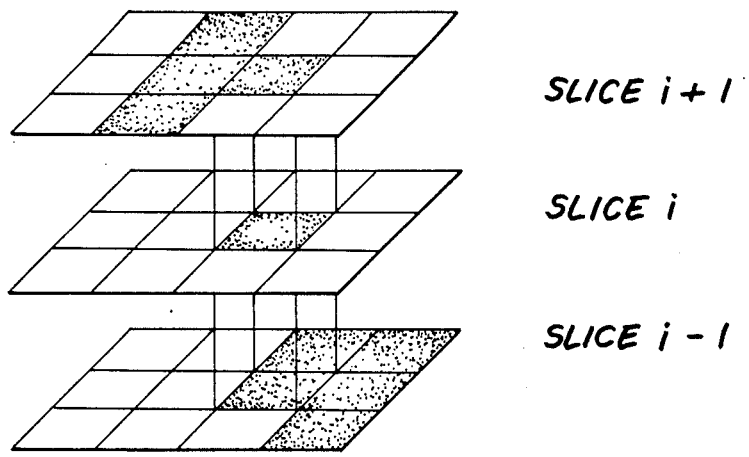
FIG. 6A is an isometric view illustrating a plurality of cells and a 1-connected adjacency criteria.
Figure 6B:
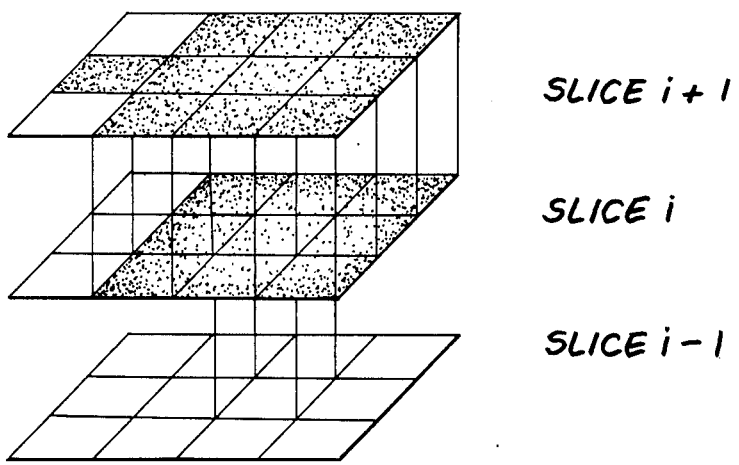
FIG. 6B is a figure similar to FIG. 6a except illustrating a 9-connected adjacency criteria.

In the description above, the number n of addresses $A_i$ accessed by comparator 20 depends upon the number of adjacent cells chosen to be compared. In the embodiment discussed above for 1-connectedness, n=6. For general 9-connectedness methods, n=26. This latter case is discussed more particularly below in reference to FIGS. 6A and 6B. However, if the cube corners are not considered, 9-connectedness accesses n=18 adjacent voxel elements.

FIG. 2 illustrates an alternate embodiment of a system in accordance with the present invention. In many ways, the system shown in FIGS. 1 and 2 are very similar. The essential difference is that in the system of FIG. 2, a tissue type label L is first associated with each cell location by means of the aforementioned threshold value(s) supplied from console 18. In FIG. 2, this threshold value is supplied to threshold determiner 22 which functions to compare each of the raw data values $D_i$ from storage means 12 with a threshold (or range) value T. If the data value $D_i$ falls within the range selected, the corresponding cell is associated with a corresponding label L (e.g., L=A, L=B, ...). Certain applications of the present invention might require selection from the same raw data, of a plurality of distinct anatomical features (substructures). Such applications might call for the display of a plurality of different bones, or might even call for the simultaneous display of lung, bronchial and vascular structures. In such circumstances, it is desirable to be able to provide sufficiently distinctive labeling for the information stored. Accordingly, it is recognized by those of ordinary skill in the art that the word length used in memory storage means 12 may be selected to contain extra bit positions beyond those required for representation of data $D_i$ for the purpose of associating that particular voxel location and data element with a particular tissue type and/or connectedness. It is also noted that threshold determination means in FIG. 2 and its counterpart in FIG. 1 are employable in a manner more appropriately characterized as an image segmentation means in which certain voxels associated with cell signal values in a certain range or ranges are selected for processing.

Accordingly, labeling means 24 may operate to provide multiple labeling indicia for each of the cell locations examined. This is accomplished simply by using multiple range comparisons and by labeling bit positions in memory means 12 accordingly. It is noted, however, that the extra label bit positions are not necessarily constrained to be within the same memory word but may, in accordance with an established convention, be associated with each other by placement in odd or even numbered adjacent address locations or in other readily accessible storage means and systems for maintaining the desired association.

It is also noted with respect to FIG. 2, that data selection means 14' functions in essentially the same manner as data selection means 14 described above. However, data supplied to means 14' from storage means 12 includes label data. Additionally, data selection means 14' also supplies initial raw data $D_i$ to threshold determination means 22 as part of the pre-labeling function of the system shown in FIG. 2. An appreciation of specific information provided by data selection means 14' may be had by viewing the data input to coparator 20' which is more particularly illustrated in FIG. 3. Comparator 20' receives central cell data with address $A_c$ and label $L_c$. The subscript "c" designates central cell data. Adjacent cell data is also provided to comparator 20'. In accordance with the present invention, there are typically provided either 6 or 26 elements of data from adjacent cells, although the present invention is not so limited. Each such element includes a label $L_i$ and an address $A_i$. Comparator 20' includes subcomparator units 205. There are n such subcomparator units. Each subcomparator receives a central data cell label code $L_c$, an adjacent cell label code $L_i$ and the address $A_i$ associated with this label code. $A_i$ provides a reference to data element $D_i$. The label code for each adjacent cell $L_i$ is compared with the central cell label $L_c$ by means of exclusive-or block 201 and subsequent inverter 208. If the label codes $L_c$ and $L_i$ are the same and if the label code for the adjacent cell corresponds to the appropriate tissue type, information is supplied to an output memory buffer 206 and an output address buffer 207. Of course, the label codes are often simply zeros and ones denoting whether or not a particular grid location is associated with a signal pattern value lying in a selected range. However, the label code may also contain a special bit indicating whether or not the grid location in question has already been marked. This bit is supplied to a gate such as an AND gate to inhibit transfer of information to the memory stack. This latter function is performed by AND block 202. A signal from AND block 202 activates blocks 204 and 203 so as to cause the flow of connectivity information to memory buffer 206 and the flow of address information to address buffer 207, respectively. It is noted in the above that blocks are labeled as "XOR" or "AND" but that this is not meant to imply that the logical block input lines represent single bit data. It is within the contemplation of the present invention that, for example, label code $L_i$ is more than one bit in length. The same is true of the label code for $L_c$. It is certainly true of the address bits associated $A_i$, all which are several bits long.

Comparator 20' is therefore seen to function in the following way. When label $L_i$ matches the tissue type label found in central grid location $L_c$, an address $A_i$ is supplied by memory buffer 206 and to address buffer 207. The address in buffer 206 is employed for the purpose of updating connectivity information associated with cell location $A_i$. The information in buffer 207 is supplied to memory stack 16 for the purpose of identifying further adjacent cell locations. Comparator 20' is therefore seen to be relatively easy to implement in hardware, primarily as a result of pre-label computations such as those that may be carried out by threshold determination means 22 and labeling means 24.

Apparatus such as illustrated in FIGS. 1 and 2 are particularly amenable to carrying out process steps in accordance with the present invention. More particularly, FIG. 4 illustrates a sequence of process steps which may be carried out in accordance with the embodiment of the present invention in which pre-labeling of raw data elements $D_i$ is not carried out. In particular, an operator supplies initial seed location and threshold values in process step 100. This initial voxel element is marked as being connected to a particular substructure A in step 102. As indicated above, different substructures may be provided with different labels, as desired. In process step 104, the top of the memory stack is set to access the initial cell location. The top of the memory stack points to the central cell location currently being examined. In process step 106, top of the memory stack 16 is accessed. This is commonly referred to as "popping" an entry from the stack. This typically involves retrieval of information from an address referenced by a pointer and modification of the stack pointer to indicate the next item in the stack below the "popped" item. In process step 108, the address from the top of the stack is used to supply data $D_i (i=1, 2, \ldots, n)$ from the central cell location and adjacent cell locations. In the present invention, n is typically either 6 or 26. Adjacent cell addresses $A_i$ are also generated from the information contained in the top of the stack. In process step 110, each data element $D_i$ is compared with threshold T (or range). In process step 112, for each cell or grid location for which $D_i$ is greater than T, that cell location is marked as being connected to the central cell currently being examined. Process step 112 illustrated in FIG. 4 carries out an embodiment of the present process based upon 1-connectedness. An alternate process step 112' is described below and is illustrated in FIG. 4A. In process step 114, for each cell for which data element $D_i$ is in the selected range, its associated address $A_i$ is added to the top of the memory stack. However, if the cell associated with address $A_i$ has already been marked as being connected, it is not necessary to add it to the stack. In process step 116, the stack is examined to determine if it is empty, that is, to see if the pointer is referencing the bottom of the stack. If the stack is empty, the process is finished save for step 118. If the stack is not empty, processing returns to step 106 and steps 106–116 are repeated. Normally, the process is terminated when the stack is empty. At this point, the $D_i$ values which have been indicated as being connected, that is marked, are supplied to a display processor means. Such means are more particularly described in the three patent applications cited above. It is noted, however, that it is also possible to interrupt the process of the present invention before the stack is empty. Such interruption, for example, might be useful in investigations relating to how the present process is performing with respect to particular sets of data.

In various experiments carried out in accordance with the present invention, it has been discerned that there are certain situations, particularly in medical applications, in which geometric, three dimensional connectedness is indicated in situations in which it would be more desirable to produce disconnected images. For example, it is possible for connectedness to be exhibited between the brain, the eye, and facial structures through the optic nerve. In other situations, overlap of structures in the adjacent slices can occur in which noise or spurious data tends to indicate connectedness where none exists. To visualize such a situation, one need only consider two pear shaped objects disposed adjacent to one another so that the narrow ends of the pair are oriented in opposite parallel directions. In order to guard against false connectedness indications, it is possible to modify process step 112 so that a higher standard of connectedness is employed. In such cases, it is desirable to consider adjacent cell locations to also include facially adjacent and bodily diagonally adjacent cells. (Here "facially adjacent" refers to cube faces which abut.) As indicated above, for this situation n=26. If only facially adjacent cell locations are considered, n=18. An appreciation of these situations may, for example, be gleaned from FIGS. 6A and 6B. In such cases, process step 112 from FIG. 4 may be modified as indicated in FIG. 4A which describes process step 112'. With this stricter connectedness criterion, an adjacent cell is considered as being connected only if all of the other cells lying in the same plane exhibit the same label value (or equivalently if the data value is in the selected range). Alternatively, it need not be required that all cells in the aforementioned slice exhibit the same label, but only that a certain number of them exhibit the same label, or that a specified configuration of adjacent cells exhibit the same label. All such criteria are considered as being within the purview of the present process.

A program flow chart description of part of a process in accordance with the present invention is also illustrated in FIG. 5. This program flow chart is similar to the process flow diagram of FIG. 4 except that it is more in keeping with conventional programming flow diagram descriptions. Also, it is more particularly addressed to the operation of comparator 20 in FIG. 1 in which pre-labeling is not employed. In block 301, the initial or seed location and threshold value are specified. The initial location value is also added to the top of the memory stack at this time. In block 302, the top of the stack is accessed and in block 303, the information contained in the top of the stack is used to retrieve adjacent data values $D_i$ at addresses $A_i$. In block 304, the data value $D_i$ is compared with threshold T (or range). If the data value is not within the desired range, the value of i is incremented in block 305 and control is returned to block 303. If the data element $D_i$ at address $A_i$ is within the desired range, cell $A_i$ is marked as being connected in block 306 and, in block 307, corresponding address $A_i$ is added to the memory stack. In block 308, i is again incremented and compared with the value n (typically 6 or 26) and control is either returned to block 303 or passed on to block 309 which determines whether or not the stack is empty. If the stack is not empty, control is returned to block 302 for repetition of the above sequence. If the stack is empty, the program terminates with the situation that each cell $A_i$ which has the same "tissue type" and which is connected to the initial or seed location is marked as forming a connected structure. This pre-processed data is then supplied to a display processing means, as described above.

Figure 7:
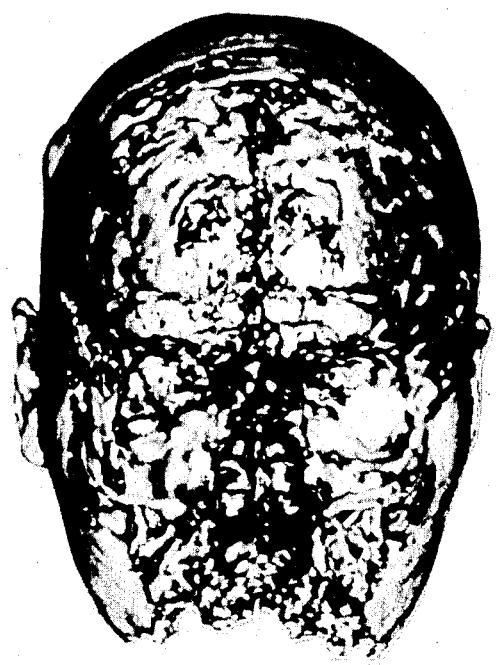
FIG. 7 is a photograph illustrating the problems associated with depicting tissue types exhibiting physical properties having the same range of values.
Figure 8:
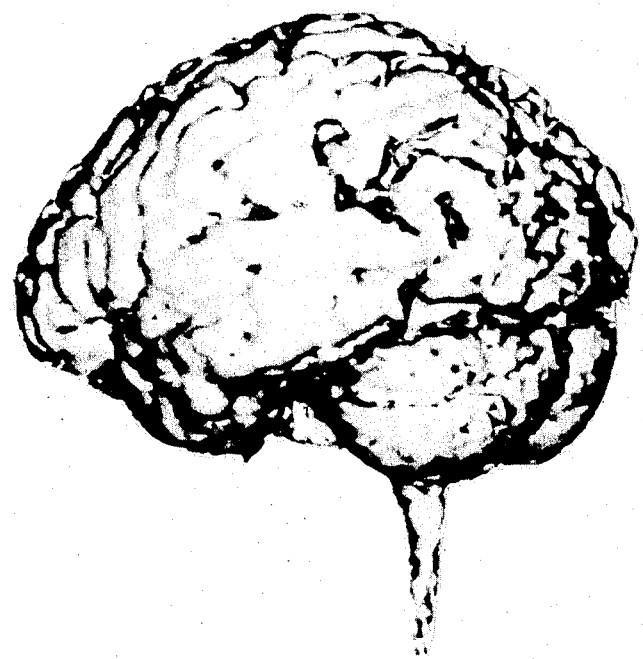
FIG. 8 is a photograph illustrating a three dimensional view of a human brain produced in accordance with the connectivity criteria of the present invention and more particularly illustrating isolation of the brain from surrounding tissue, particularly facial tissue.

The advantages of the present invention are best appreciated by comparison of FIGS. 7 and 8. Both of these figures are based upon the same set of magnetic resonance imaging data. In FIG. 7, an attempt was made to display brain tissue by selecting a range of data values typically associated with brain tissue. However, it is seen that skin tissue also exhibits a similar range of values so that the image displayed is a virtually hopeless comingling of the two kinds of tissue. It is seen that meaningful anatomical information is hard to glean from FIG. 7. However, when three dimensional geometric connectivity is employed in addition to selection of an appropriate tissue data value range, much more meaningful images can be displayed. In particular, FIG. 8 illustrates a clear image depicting only the brain structure. It is therefore seen that the method and system of the present invention produce significantly improved and meaningful medical diagnostic images.

In order to provide a clearer understanding of the system and method of the present invention and its several variations, FIGS. 9A-9T illustrate a two dimensional example of connectivity. It is noted that FIG. 9 is provided only for illustrative purposes and is limited to two dimensions for ease of understanding. It is important to note that the system and method of the present invention are not so limited.

FIG. 9A illustrates an array of 13 rows and 13 columns of numbers representing data values $D_i$. Addresses for numbers in this array are provided by an ordered pair of numbers designating first the column and then the row. For example, at (3,9) the data value is 6. A threshold value of 6.5 is indicated for this set of data elements. The data array in FIG. 9A may be used to generate a supplemental array having the same dimensions in which those cell locations having data values $D_i$ below 6.5 are set to 0 and those data cell locations having data values in excess of 6.5 are set to 1. The resulting binary array is illustrated in FIG. 9B. This corresponds to the labeling operation described above. As pointed out above, this operation may be carried out so as to generate an entirely new 13 by 13 data array or equivalently, various bit positions may be reserved in the data words themselves to indicate the labeling operation. It is furthermore noted that the labeling illustrated in FIG. 9B essentially divides the tissue type data into two classes. It is pointed out, however, that it is equally possible to divide the tissue types into as many classes as is reasonably desirable, depending of course, upon the nature of the object being studied and the specific physical property or properties being measured. It is also noted that the data, as represented in FIG. 9B, is visually more indicative of the three disconnected substructures present in the data as thresholded and which are more particularly outlined in FIG. 9C. It is however, noted that the numerical values provided in FIG. 9A need not be discarded in favor of the more quantized data shown in FIG. 9C.

FIGS. 9D-9R more particularly illustrate the connectedness marking procedure of the present invention. Thus, in FIG. 9D location (5,7) is shown as the seed location. In 1-connectedness mode, adjacent grid locations (5,6), (6,7), (5,8), and (4,7) are tested. The data contents of cells (4,7) and (5,8) are found to be labeled differently than central cell (5,7). Accordingly, these two cells are not marked. However, cells (5,6) and (6,7) are found to contain the same label as central cell (5,7) and accordingly, are marked as being connected. This connectedness is illustrated in FIG. 9E in which these cells are marked with an "A" to indicate that they are part of what has so far been determined to be a connected substructure. Seed location (5,7) is also so marked. It is noted that in FIGS. 9D-9R that the central or test cell in each figure is doubly hatched. It is also noted that up to four adjacent cells in each of these figures are also indicated by a single hatching pattern within the cell. However, cells which have already been marked need not be tested again and accordingly, are not hatched.

In FIG. 9E, it was determined that the cells at locations (5,6) and (6,7) were connected and had not been previously marked as such. Accordingly, these cell locations, namely locations (5,6) and (6,7) are added to the memory stack. In particular, location (5,6) now appears at the top of the memory stack and in the next iteration of the present method, it is this location which plays the role of the central or test location. This circumstance is illustrated in FIG. 9F. There it is seen that unmarked adjacent cells include cells (4,6), (5,5) and (6,6). However, it is seen that cells (4,6) and (5,5) do not contain the same desired label, namely "1". However, cell (6,6) is seen to contain the same label, namely "1" and accordingly, it is now marked with an "A" to indicate that it is connected to the substructure that has been discerned so far. As above, cell (6,6) is now added to the top of the stack. The stack now contains addresses (6,6) and (6,7). This process continues as illustrated in the comments at the bottom of the arrays in FIGS. 9G-9R. At this point, the stack is empty and it is seen that all of the connected cells have been marked with an "A". If desired, it is noted that at this point a different seed location could be chosen within one of the other substructures, with connectedness thereto being indicated by a different marking convention, for example, the use of the letters "B" or "C".

FIG. 9S provides an illustration of this by hatching all of those cell locations which were inspected as a result of the process of the present invention. This clearly indicates that all locations that should have been investigated for connectedness were in fact so tested and that other seed locations in other substructures can now be chosen if desired.

FIG. 9T illustrates one way in which the system and method of the present invention operates as a preprocessor or selector for methods such as the dividing cubes or marching cubes display methods described in the above-identified, commonly assigned patent applications. In particular, FIG. 9T illustrates the fact that the resultant A-marked data elements may be selected from amongst the totality of data elements listed originally in FIG. 9A. It is from three dimensional data array configurations such as that shown in two dimensions in FIG. 9T that isolated brain images such as that illustrated in FIG. 8 are constructed. In an alternate embodiment of the present invention, it is noted that when data elements $D_i$ are all positive or are adjusted to be so, that it is possible to indicate connectedness of substructural data elements by simply turning on a sign bit associated with the connected data elements. If this is done, the resultant data is stored in manner indicated by FIG. 9U.

The use of a single bit mask array associated with the data cell elements is particularly useful in those situations in which the present system and method is employed in conjunction with either the marching cubes or dividing cubes algorithm. In a combination system and method, one step involves applying a previously generated binary mask array to the three dimensional data. This involves modification of two steps in the reconstruction algorithms. In the first step, an index is calculated to determine whether the surface passes through each volume element (voxel). Originally, this involved a simple test between the 8 vertices of the voxel and the value of the surface being reconstructed. In this new method, the mask bit is AND-ed into the surface value being tested. The original test is then performed. It is then seen that this produces a non-zero index only for those voxel elements which exceed the surface value and have the mask bit on. In the second step, when interpolating the intersection of the surface with the voxel element and subsequent normal calculations, the mask bit is turned off. The final result is a reconstruction of the surface of the substructure selected by the user.

From the above, it should be appreciated that the system and method of the present invention provide a significant advance in medical diagnostic imaging systems. More generally, however, it is seen that the system and method of the present invention is also applicable to the determination of substructures within almost any three dimensional object. It should also be appreciated that the system and method of the present invention are also readily implementable on currently available digital computers and with currently available graphics display devices. It is also seen that the system and method of the present invention provides physicians and radiologists with significant new tools in the treatment of disease, injury and genetic deformities. It is also noted that the system and method of the present invention are not limited to the display of internal organs only, but may also be employed for displaying data associated with chemical and physiological processes, particularly as measured by magnetic resonance imaging and various emission radiography systems.

While the invention has been described in detail herein in accord with certain preferred embodiment thereof, many modifications and changes therein may be effected by those skilled in the art. Accordingly, it is intended by the appended claims to cover all such modifications and changes as fall within the true spirit and scope of the invention.

The invention claimed is:

1. A method for determining, in three dimensions, connected substructures within a body, said method comprising the steps of:

(a) storing, in a memory means, three-dimensional signal patterns representing the value of at least one physical property associated with substructures within said body at regularly spaced parallelopiped grid locations within said body;
   (b) labeling said stored signal patterns wherein those signal patterns representing values which lie within a specified range receive a same label;
   (c) storing and placing on a memory stack an initial grid location, said grid location corresponding to a position within or on a desired internal substructure of said body;
   (d) selecting and removing the grid location from the top of said memory stack;
   (e) comparing the label associated with said grid location selected from said memory stack with labels associated with adjacent grid locations to identify grid locations having the same label as said label associated with the grid location from said stack;
   (f) marking, as connected, those grid locations for which a selected arrangement of adjacent grid locations exhibit the same label;
   (g) storing on said memory stack a list of any of said marked grid locations; and
   (h) repeating steps (d), (e), (f) and (g) for a plurality of times not to extend beyond the occurrence of an empty stack.

2. The method of claim 1 further including the step of
   (i) selecting those signal pattern values stored in step (a) having grid locations marked as connected in accordance with step (f).

3. The method of claim 2 further including the step of
   (j) supplying said selected signal pattern values from step (i) to a display processor for displaying a three-dimensional image of said connected substructure.

4. The method of claim 1 in which, in step (f), said selected arrangement comprises a single 1-connected cell.

5. The method of claim 1 in which, in step (f), said selected arrangement comprises a set of 9-connected cells lying in a plane.

6. The method of claim 1 in which the number of adjacent grid locations is 6.

7. The method of claim 1 in which the number of adjacent grid locations is 26.

8. The method of claim 1 in which steps (d), (e), (f) and (g) are repeated until said memory stack is empty.

9. A method for determining, in three dimensions, connected substructures within a body, said method comprising the steps of:

(a) storing, in a memory means, three-dimensional signal patterns representing the value of at least one physical property associated with substructures within said body at regularly spaced parallelopiped grid locations within said body;
   (b) selecting an initial grid location and storing said initial location on a memory stack;
   (c) selecting and removing the grid location from the top of said memory stack;
   (d) retrieving, from said memory means, a signal pattern value associated with the grid location indicated by the top of said stack, said grid location designated by the top of said stack being referred to as the central grid location, and also retrieving from said memory means signal pattern values associated with grid locations adjacent to said central location;

(e) comparing the signal pattern values of said adjacent grid locations to determine which of said values lie within a specified range;

(f) marking as connected those grid locations with associated values within said range and for which a selected arrangement of adjacent grid locations exhibit values in the same range as said central grid location;

(g) storing on said memory stack a list of any of said marked grid locations; and (h) repeating steps (d), (e), (f) and (g) for a plurality of times not to extend beyond the occurrence of an empty stack.

10. The method of claim 9 further including the step of (i) selecting those signal pattern values stored in step (a) having grid locations marked as connected in accordance with step (f).

11. The method of claim 10 further including the step of (j) supplying said selected signal pattern values from step (i) to a display processor for displaying a three-dimensional image of said connected substructure.

12. The method of claim 9 in which, in step (f), said selected arrangement comprises a single 1-connected cell.

13. The method of claim 9 in which, in step (f), said selected arrangement comprises a set of nine connected grid locations lying in a plane.

14. The method of claim 9 in which the number of adjacent grid locations is 6.

15. The method of claim 9 in which the number of adjacent grid locations is 26.

16. The method of claim 9 in which steps (d), (e), (f) and (g) are repeated until said memory stack is empty.

17. A system for determining, in three dimensions, connected substructures within a body, said system comprising:

memory means for storing three-dimensional signal patterns representing the value of at least one physical property associated with substructures within said body at regularly spaced parallelopiped grid locations within said body;

means for labeling said grid locations wherein those grid locations having signal pattern values which lie within a specified set of range values receive a same label;

memory stack means for storing an initial grid location and subsequent grid locations, the top of said stack thus identifying a central grid location for determination of connectedness thereto;

means for selecting and removing the central grid location from the top of said memory stack;

means for supplying said labels associated with grid locations which are adjacent to the grid locations specified by said memory stack;

means for comparing the labels associated with selected ones of said adjacent grid locations;

means for marking, as connected, those grid locations which exhibit the same label as said grid location associated with the grid location from said stack and for which a selected arrangement of adjacent grid locations exhibit the same label;

means for storing on said memory stack a list of any of said marked grid locations.

18. The system of claim 17 in which said adjacent grid locations are six in number.

19. The system of claim 17 in which said adjacent grid locations are twenty-six in number.

20. The system of claim 17 further including means for selecting signal pattern values associated with said marked grid locations.

21. The system of claim 20 further including display processor means for display of said connected substructure as specified by said selected marked grid locations.

22. The system of claim 17 in which said selected arrangement comprises a single grid location.

23. The system of claim 17 in which said selected arrangement comprises a set of nine grid locations lying in a plane.

24. The system of claim 17 further including means for generating said three-dimensional signal pattern values and for supplying signal patterns representing said values to said memory means.

25. The system of claim 24 in which said generating means includes an x-ray scanner.

26. The system of claim 24 in which said generating means includes a magnetic resonance imaging device.

27. A system for determining in three dimensions, connected substructures within a body, said system comprising:

means for storing three-dimensional signal patterns representing the value of at least one physical property associated with substructures contained within said body at regularly spaced parallelopiped grid locations;

memory stack means for storing an initial grid location and subsequent grid locations the top of said stack thus identifying a central grid location for determination of connectedness thereto;

means for retrieving the signal pattern value associated with the central grid location specified by said memory stack means and the signal pattern values associated with grid locations adjacent to said central grid location as specified by said memory stack;

means for comparing the signal values associated with said central grid location and said adjacent grid locations to determine which of said values lie within the same specified range as said central grid location value;

means for marking, as connected, those grid locations which exhibit values lying in the same range as said central grid location value and for which a selected arrangement of adjacent grid locations also exhibits values lying in the same range as said central grid location value; and means for storing, on said memory stack, a list of any of marked grid locations.

28. The system of claim 27 in which said adjacent grid locations are six in number.

29. The system of claim 27 in which said adjacent grid locations are twenty-six in number.

30. The system of claim 27 further including means for selecting signal pattern values associated with said marked grid locations.

31. The system of claim 30 further including display processor means for display of said connected substructure as specified by said selected marked grid locations.

32. The system of claim 27 in which said selected arrangement comprises a single grid location.

33. The system of claim 27 in which said selected arrangement comprises a set of nine grid locations lying in a plane.

34. The system of claim 27 further including means for generating said three-dimensional signal pattern values and for supplying signal patterns representing said values to said storing means.

35. The system of claim 34 in which said generating means includes an x-ray scanner.

36. The system of claim 34 in which said generating means includes a magnetic resonance imaging device.

* * * * *